US008417851B2

(12) United States Patent
Adar et al.

(10) Patent No.: US 8,417,851 B2
(45) Date of Patent: Apr. 9, 2013

(54) POLLING OF A TARGET REGISTER WITHIN A PERIPHERAL DEVICE

(75) Inventors: Etai Adar, Yokneam Ilit (IL); Eric F. Robinson, Raleigh, NC (US); Yossi Shapira, Shoham (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/169,403

(22) Filed: Jun. 27, 2011

(65) Prior Publication Data

US 2012/0331184 A1   Dec. 27, 2012

(51) Int. Cl.
G06F 3/00 (2006.01)
G06F 5/00 (2006.01)
G06F 13/00 (2006.01)
G06F 13/22 (2006.01)

(52) U.S. Cl.
USPC ............ 710/46; 710/44; 710/47; 710/109; 710/220; 710/3; 710/22; 710/28

(58) Field of Classification Search ............ 710/22, 710/3, 28, 44, 46, 47, 109, 220
See application file for complete search history.

(56) References Cited

U.S. PATENT DOCUMENTS 4,763,243 A * 8/1988 Barlow et al. ............. 710/107
5,938,742 A * 8/1999 Faddell et al. ............. 710/9
7,042,729 B2   5/2006 Dias et al.
2004/0031034 A1   2/2004 Lewis
2004/0267993 A1 * 12/2004 Spencer et al. ........... 710/110
2006/0156024 A1 * 7/2006 Zayas et al. .............. 713/182
2006/0190668 A1 * 8/2006 Biran et al. ............... 710/315
2007/0143534 A1 * 6/2007 Hashimoto et al. ........ 711/103
2007/0198757 A1   8/2007 Kim
2008/0126855 A1 * 5/2008 Higashijima et al. ...... 714/16

OTHER PUBLICATIONS

Periodically—Definition from the Free Miriam-Webster Dictionary, Date accessed: Apr. 17, 2012, http://www.merriam-webster.com/dictionary/periodically.*

* cited by examiner

*Primary Examiner* — Farley Abad
(74) *Attorney, Agent, or Firm* — H. Daniel Schnurmann; Jeffrey L. Streets

(57) ABSTRACT

In a disclosed example of a method, a requested value of a target register may be specified as a precondition to performing a requested read or write operation. The requested read or write operation may be generated by a requesting device, such as a processor, and sent over a bus to a peripheral device containing the target register. The target register may be polled internally to the peripheral device without generating additional bus traffic between the requesting device and the peripheral device. A ring topology may be used to internally poll the target register and to perform the requested read or write operation when the polled value of the target register equals the requested value.

14 Claims, 6 Drawing Sheets

POLLING OF A TARGET REGISTER WITHIN A PERIPHERAL DEVICE

BACKGROUND

1. Field of the Invention

The present invention relates to processing input and output to hardware registers of a computer system, and more particularly to polling device registers in carrying out read and write requests.

2. Background of the Related Art

Memory-mapped input/output (MMIO) is used to perform input/output (I/O) from a central processing unit (CPU) to system memory and hardware registers of peripheral devices over the same bus. The system memory and peripheral devices are each assigned a different address space. Hardware registers on each peripheral device, are mapped to specific addresses within the address space assigned to that peripheral device. In one implementation of MMIO, each peripheral device monitors the CPU's address bus for I/O activity referencing its assigned address space. In another implementation, an MMIO ring comprising an MMIO master and slaves is used to direct I/O traffic between the CPU and the peripheral devices, wherein each slave is responsible for a different subset of device registers. The MMIO master delivers Read/Write (R/W) command packets from the processor bus to the MMIO ring. Each command packet is passed to the MMIO slave that is responsible for the relevant device register. To process a write command, the MMIO slave may take the data from the data packet following the command packet and write the data to the relevant register. To process a read command, the MMIO slave may read the relevant register and put its data in a data packet following the command packet.

Polling is sometimes performed by the CPU to determine when a peripheral device is ready to handle a R/W request. In conventional polling methods, the CPU communicates with the peripheral device over the bus to periodically check the status of the peripheral device, which generates polling traffic on the bus. A mailbox is an example of an application in which polling is used. A mailbox provides a way of communicating between software threads without requiring the use of interrupts. When a thread (the producer) wants to send a message to another thread (the consumer), the producer polls a status bit in the mailbox (a part of system memory) to see if there is a valid buffer for its message. When the status bit indicates that there is an available buffer, the producer writes the message to the mailbox and sets another status bit (the "doorbell ring") to indicate that a message is ready to be read by the consumer. Likewise, the consumer polls the doorbell ring status bit(s) in order to know when it has an available message to read.

BRIEF SUMMARY

A method of controlling input/output (I/O) at a peripheral device of a computer system is disclosed. According to the method, a requested read or write operation is received at a peripheral device along with a requested value of a target register on the peripheral device as a precondition to performing the requested read or write operation. The requested read or write operation and the requested value of the target register may be communicated over a bus from a requesting device, such as a CPU, to the peripheral device. Internally to the peripheral device, the value of the target register is periodically polled. In response to the polled value of the target register having the requested value, the read or write operation is performed and a result of the read or write operation is output. The outputted result may then be communicated back over the bus to the CPU or other requesting device. The method may be performed by a computer program product including computer usable program code embodied on a computer usable storage medium.

A computer system is also disclosed. The computer system includes a peripheral device having a device controller. The device controller is configured for receiving a requested read or write operation along with a requested value for a target register of the peripheral device. The device controller periodically polls the target register until the target register has the requested value and, in response to the target register having the requested value, performs the read or write operation and outputting a result of the read or write operation.

DETAILED DESCRIPTION

A system and method are disclosed for internally polling a device register associated with a requested read or write operation that reduces or eliminates the bus traffic normally associated with conventional polling methods. For example, as applied to a computer system having a central processing unit ("CPU") and one or more peripheral devices addressable over an address bus, the CPU may initially communicate a request for a read or write (R/W) operation over the bus to the peripheral device. A specific value of a target device register may be specified along with the requested R/W operation as a precondition to performing the requested R/W operation. After the requested R/W operation has been dispatched to the peripheral device, the target device register may be automatically polled, internally within the hardware of the peripheral device, rather than being repeatedly polled by the CPU over the bus. The peripheral device itself is given responsibility for polling a target register of the peripheral device for a requested R/W operation received by the peripheral device. This avoids repetitive polling traffic over the address bus, which reduces the use of bus bandwidth and power resources normally associated with polling. Other system resources, such as the processor execution pipe and system bus, then are relieved to perform other tasks. An amount of bandwidth savings and power savings that may be achieved in this manner is particularly substantial when a high polling rate or lengthy polling period would normally be expected, such as when an event being polled occurs infrequently.

Figure 1:
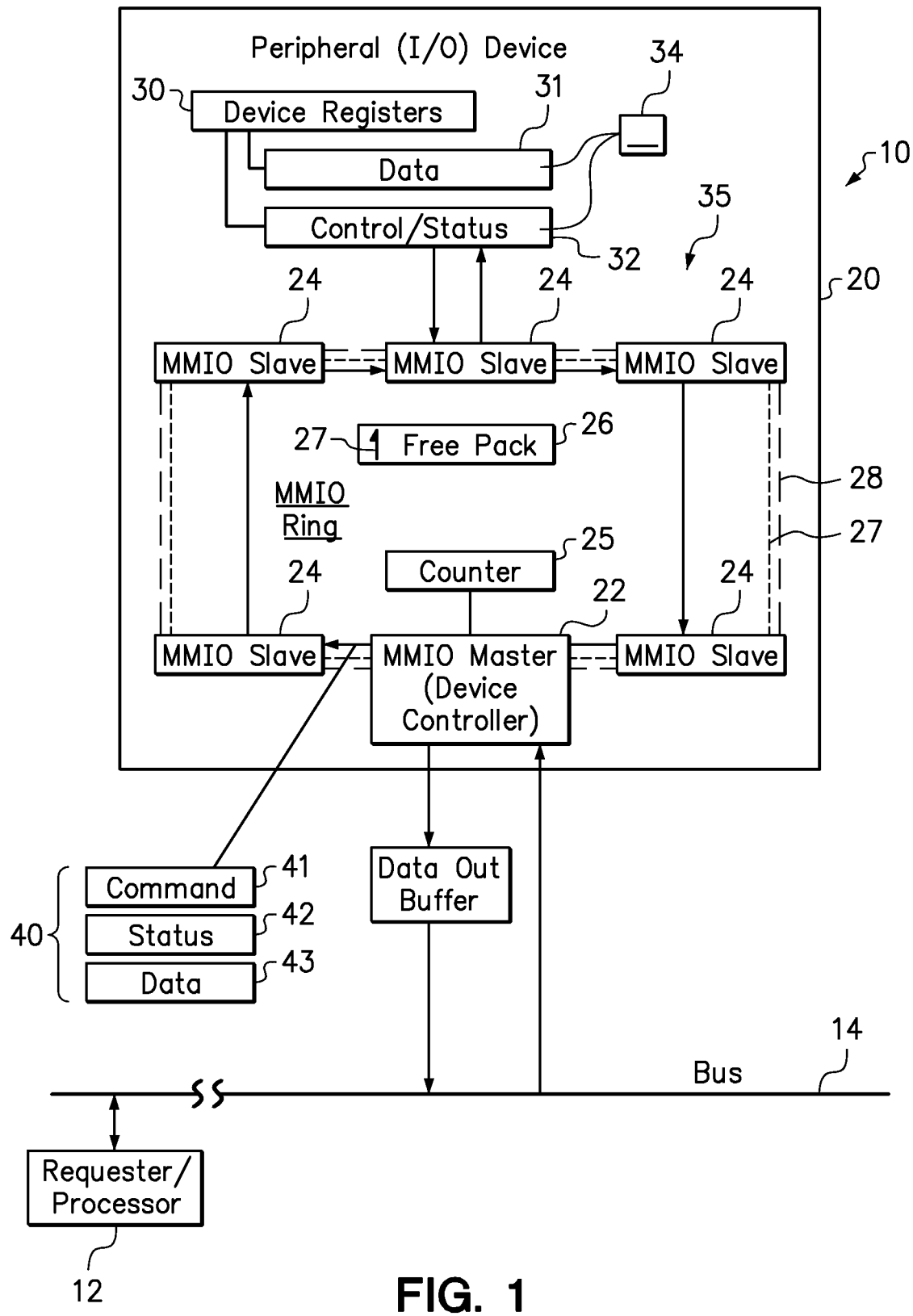
FIG. 1 is a schematic diagram of one example of a system for performing read and write operations to a peripheral device, in which a device register may be polled internal to the peripheral device.

FIG. 1 is a schematic diagram of an example system 10 for performing read and write operations to a peripheral device 20, in which device registers 30 may be polled internal to the peripheral device 20. The system 10 includes a processor 12 in communication with the peripheral device 20 over a bus 14. Although only one peripheral device 20 is shown, it will be understood that the processor 12 may be in communication with other peripheral devices and with system memory (not shown) over the same bus 14. The processor 12, which may be a central processing unit (CPU), transmits requested read or write (R/W) operations to the peripheral device 20 over the bus 14. Each peripheral device and system memory has a different address space, which allows the processor 12 to selectively address device registers at any of the system memory and peripheral devices.

The device registers 30 on the illustrated peripheral device 20 are mapped to (associated with) specific address values within the unique address space assigned to the peripheral device 20. The device registers 30 comprise a small amount of storage, such as a given number of bits (e.g., 16-bit registers). Each device register 30 is associated with a logical address within the address space assigned to the peripheral device 20. Two examples of device registers include data registers 31 and control/status registers 32. The data registers 31 store data used by the peripheral device 10, while the control/status registers 32 are used to select or record a current mode of operation of the device. Other types of device registers generally known in the art may also be included among the device registers 30. For at least some requested R/W operations, the processor 12 may specify a requested value of one or more target register 34, as a precondition to performing the requested R/W operation. The requested value could be the value of a single-bit, such as a particular status bit of a single target register 34. Alternatively, the target value may be the value of multiple bits, such as a string of data bits within one or more target registers 34.

A ring topology is provided by way of example for handling of the R/W requests, although the disclosed inventive principles may be applied to other topologies, such as a star topology. An MMIO ring 35 is provided, comprising an MMIO master. In the figure, the term "Device Controller" refers to an element that communicates with the bus 14 on behalf of the Peripheral I/O device 20, and the "MMIO master" 22 refers to control logic controlling the MMIO ring 35, wherein the MMIO slaves 24 respond to command packets sent by the MMIO master 22. The peripheral device 20 may have a single point of contact with the bus 14. In this context, the MMIO master 22 and MMIO slaves 24 provide a means by which MMIO registers in the device 20 can be accessed by the bus 14. Alternatively, the MMIO ring 35 could be a separate network, wherein each MMIO slave 24 controls the access to all of the registers for a single device.

In one example, the MMIO master 22 may use fourteen bits to access up to 16,000 (16k) registers, although a single peripheral device will typically have tens or hundreds of associated registers. It should be recognized that the invention is not limited to the number of address bits or the number of registers. The ring bus 28 may comprise a parallel data bus having, for example, a 16-bit width along which to carry bits of the transaction frame 40, although other parallel bus bit widths may be used. The ring bus 28 may alternatively comprise a single-lane serial bus. Each MMIO slave 24 is responsible for handling R/W operations for a different subset of the device registers 30 on the peripheral device 20. In requesting a R/W operation, the processor 12 generates a read/write operation on the bus 14. The MMIO master 22 in the target peripheral device 20 then takes this R/W operation and generates a local MMIO transaction frame 40 consisting of a command packet 41, a status packet 42, and a data packet 43. The transaction frame 40 is discussed in more detail below with reference to FIG. 2. The MMIO master 22 sends the transaction frame 40 to the MMIO ring 35 where the transaction frame 40 is then passed between slaves 24 until it reaches the particular slave 24 assigned to the address of the target device register 34. The MMIO slave 24 assigned to the address of the target device register 34 then handles the requested R/W operation.

A polling process is initiated within the peripheral device 20 whenever a requested value is specified and the target register 34 does not initially contain the requested value. If polling is necessary, the MMIO ring 35 does not immediately return the current value, which avoids polling traffic on the bus 14 that would otherwise be generated if the processor 12 were required to poll the target register 34. Instead, the MMIO master 22 will periodically poll the target register 34 internal to the peripheral device 20. The MMIO master 22 does not send a response to the processor 12 until the target register 34 contains the requested value. By confining the polling to the peripheral device 20, no polling traffic is generated on the bus 14, which frees bandwidth and reduces energy consumption on system resources.

As an example, the requested R/W operation may specifically be a read operation, and the target register 34 may be a single buffer status bit. The device registers 30 may be configured so that the status bit of the target register 34 is set (to a value of "1") in response to a write operation and cleared (to a value of "0") in response to a read operation. By this convention, a value of "0" for the status bit would indicate that the present value of the data has already been read, and a value of "1" would indicate that the data contains data that has been updated since a previous read. Applying this hypothetical configuration to a polling example, if the target register 34 does not initially contain the requested status bit value of 1 when the request for a read operation is received, then polling may be initiated, wherein the MMIO master 22 may periodically poll the target register 34 internal to the peripheral device 20. When the polled value of the status bit in the target register 34 finally returns the requested value of "1" then the MMIO slave 24 performs the requested R/W operation. In the case of performing a requested read operation, the MMIO slave 24 may take the updated value of selected data in the data register(s) 31 and return that data to the MMIO master 22, which then forward the data over the bus 14 to the processor 12. In response to having read the data, the target register 34 in this example may be cleared back to 0.

An MMIO slave counter 25 is provided to track the total number of MMIO slaves 24 currently waiting for a polled value to occur as a precondition to performing a requested R/W operation. If the target register 34 does not initially contain the requested value when the requested read operation is received, the MMIO slave 24 is suspended, responding with a "suspend" status and incrementing the counter 25. The suspend status signifies to the MMIO master 22 that the requested R/W operation is not yet ready to be performed because the requested value of the target register 34 has not been obtained. Accordingly, the MMIO master 22 will not return a response to the processor 12 yet. When the requested value of a target register is obtained in subsequent polling, the MMIO slave 24 is "unsuspended." The unsuspended MMIO slave 24 is then ready for its requested R/W operation to be performed, in response to which the result of the R/W operation is returned to the processor 12 and the counter 25 is decremented.

There are multiple options for how the MMIO master 22 may automatically poll the target register 34. In a first example implementation, the MMIO master 22 will periodically make a "free" packet 26 available to the MMIO ring during moments when the MMIO master 22 is idle, without requiring any express request for a free packet from any of the MMIO slaves 24. The free packet is (or at least includes) a data-type packet used to carry requested data to the MMIO master 22. The free packet 26, however generated, is not targeted to a specific MMIO slave 24, but rather is available to any of the MMIO slaves on a first-come, first-served basis. Any previously unsuspended MMIO slave 24 can use this free packet 26 to send its data to the MMIO master 22. The MMIO slave 24 that uses this "free" packet may set a Reservation status bit to a particular bit value represented as "ACK", to indicate to other MMIO slaves 24 that this free packet is reserved. When the MMIO master 22 gets this free packet for which the Reservation status bit is set, the MMIO master 22 extracts the data from the free packet 43 and sends that data to the processor 12 on the processor bus 14. After extracting the data, the MMIO master 22 decreases the counter 25 and clears the Reservation status bit. A counter value of zero indicates that none of the MMIO slaves are currently polling one of their assigned registers for a requested value, in which case the MMIO master may stop sending new free packets to the ring.

In a second example implementation, an unsuspended MMIO slave 24 may set a Free Packet Request status bit. This Free Packet Request bit is preferably communicated to the MMIO master using a side-band bus 27 and not as part of the transaction frame 40. The side-band bus 27 could be a single electronic pathway or "wire" that is shared by all of the MMIO slaves to indicate their need for free packets. It would alternatively be possible to set the Free Packet Request bit (Bit 2) on an arriving frame 40, although there may not be any immediate frame traffic when a slave becomes ready to send its data, which would delay the opportunity for an MMIO slave to signal to the MMIO master that it needs a free packet. The Free Packet Request status bit is used to flag the MMIO master 22 that the unsuspended MMIO slave 24 is ready to have a requested R/W operation performed.

A third example implementation is a combination of the first two. The MMIO master 22 may send a free packet 26 to the MMIO ring 35 in affirmative response to receiving a Free Packet Request status bit, and at any other moment when the counter 25 is greater than zero and the MMIO master 22 is idle.

A built-in timeout function may be employed to avoid an apparent hang from the perspective of the processor 12 requesting the R/W operation. A timeout occurs if the requested value for the target register has not occurred within a predefined timeout interval. In response to a timeout, the requested R/W operation is optionally satisfied with data that is presently available. The processor 12 requesting the R/W operation then has the option to re-request the R/W operation, which reinitiates polling within the peripheral device 20. To minimize any bus traffic, the timeout interval may be fairly long in comparison to the rate at which polling occurs, so that the frequency of any re-request(s) along the bus 14 is small in relation to the rate at which the target register 34 is polled internal to the peripheral device 20.

One or more timeout intervals and subsequent re-requests may occur before the requested value of the target register is obtained. Each re-request by the processor 12 at the conclusion of successive timeout intervals may be considered an instance of polling, in addition to internal polling that occurs during each timeout interval. Thus, polling bus traffic is not eliminated, as the re-requests transmitted from the processor 12 to the peripheral device 20 over the bus 14 may be regarded as polling traffic on the bus 14. However, any such polling traffic on the bus 14 will be reduced, often dramatically, as compared with conventional polling methods, in that polling may be performed internally at the peripheral device 10 for the duration of each timeout interval between successive requests or re-requests.

Figure 2:
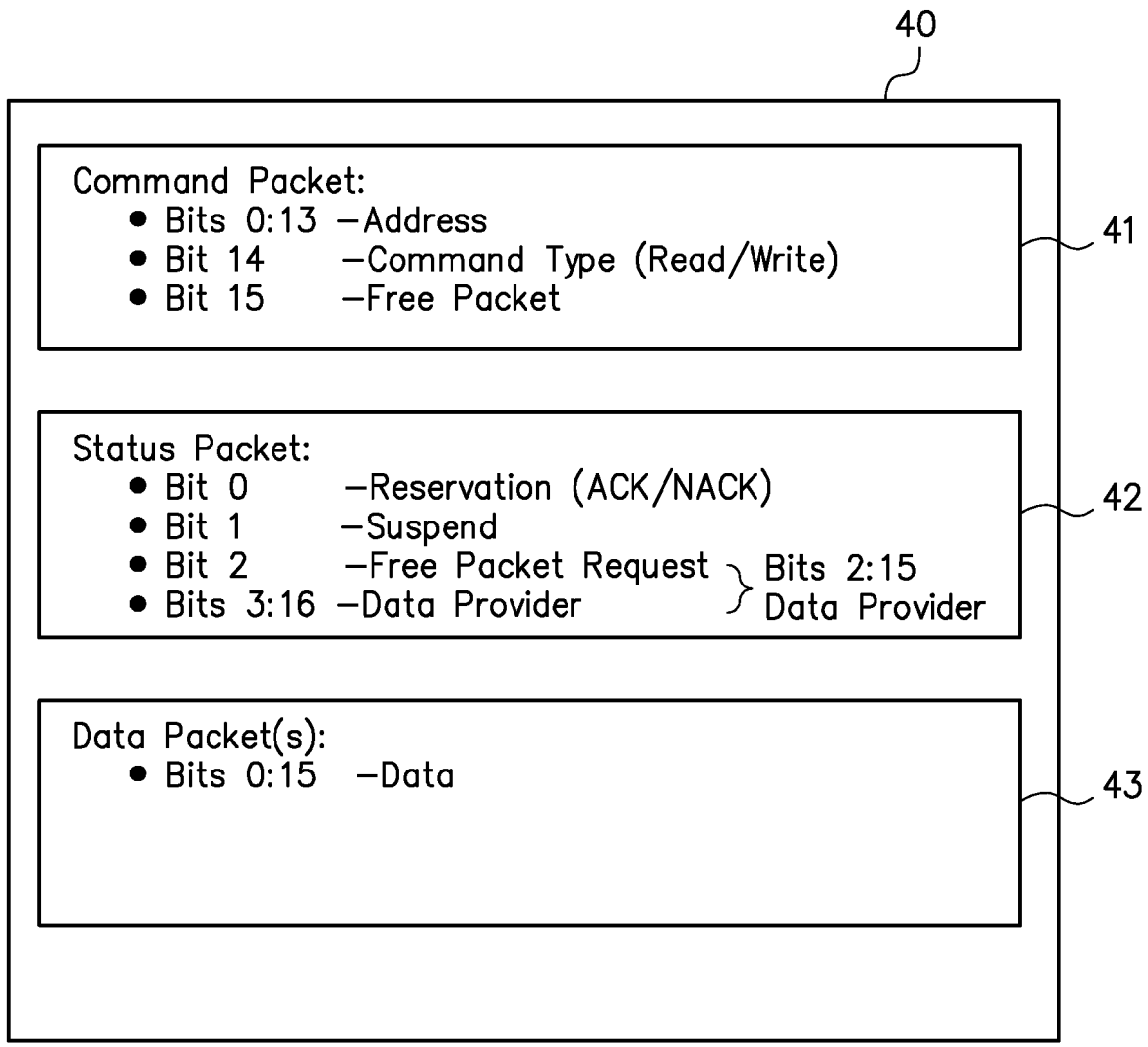
FIG. 2 is a diagram further detailing an example of a transaction frame.

FIG. 2 is a diagram further detailing an example transaction frame 40 generated by the MMIO master. The transaction frame 40 comprises the Command packet 41, Status packet 42, and Data packet 43. In the illustrated example, the Data packet 43 and the Command packet 41 each have a length of 16 bits (two bytes). The first fourteen bits (Bits 0:13) of the Command packet are Address bits, which may be used to specify the address of a particular device register on a particular peripheral device. In the 16-bit packet, a total of fourteen address bits may be allocated to facilitate decoding the address, including a number "X" of bits to select a group of slaves, a number "Y" of bits to select a slave within a group, and a number "Z" of bits to select a register within a slave. This fourteen-bit address is used for selecting a register within a peripheral device that has already been selected by the bus. However, as mentioned above, an MMIO ring could span multiple peripheral devices with one or more MMIO slaves per device, in which case some of the address bits could be used to select the particular peripheral device to which a requested R/W operation is directed.

The Command packet 41 further includes a Command bit (Bit 14) specifying the type of command to be performed, which is typically either a read command used to request a read operation or a write command used to request a write operation. For example, a bit value of 0 may be selected to request a read operation and a bit value of 1 may be selected to request a write operation. If a read command (0) is specified by the Command bit, then the Data bits 0:15 of the Data packet 43 will be used to receive the data from the register requested at the address specified by Address bits 0:13 of the Command packet 41. If a write command is specified by the Command bit, then the Data bits 0:15 of the Data packet 43 may instead be used to carry the data to be written to the register at the address specified by Address bits 0:13 of the Command packet 41.

An MMIO slave handling a R/W operation for which a requested value of a target register has not yet occurred may set a Suspend bit, which is Bit 1 of the status packet in this example. The MMIO slave sets the Suspend bit to indicate it is not ready to return the requested data, and the MMIO slave will then poll the target register for the duration of any timeout interval. A status packet 42 returned to the MMIO master with the Suspend bit set indicates to the MMIO master that the MMIO slave handling the request is busy polling and is not ready to return the requested data. The MMIO master increases a slave counter in response to receiving a packet wherein the Suspend bit was set.

A free packet may be made available to any unsuspended MMIO slave on a first-come, first-served basis for sending the result of a R/W operation to the MMIO master. Bit 15 of the Command packet 41 may be referred to as the Free Packet bit (not to be confused with the Free Packet Request bit), and may be set to indicate that the data packet 43 included in this transaction frame 40 is a free packet (sometimes referred to as a free packet read frame.) The MMIO master may set this free packet bit and send the transaction frame 40 including the free packet to the ring when the MMIO master wants to poll a suspended MMIO slave. A Reservation bit, which is Bit 0 of the Status Packet 42 in this example, is used by an MMIO slave to reserve a free packet that arrives at the MMIO slave from the ring. The Reservation bit is set (1="ACK") when reserved and cleared (0="NACK") when not reserved. A previously suspended MMIO slave that is now ready to return the result of an R/W operation should use the data packet 43 to return the requested data when the Free Packet bit is set. An MMIO slave who receives a free packet but that is not ready to return data should instead ignore the Address bits (0:13) of the transaction frame 40 and pass the transaction frame 40 to the next MMIO slave in the MMIO ring. If the transaction frame 40 arrives back at the MMIO master with the Free Packet bit set and the Reservation bit not set, the MMIO master may infer that no MMIO slave has used this free packet.

The status packet 42 may further include a data provider field at bits 3:16 to provide a 14 bit address identifying the register from which data has been read. This register address allows the device controller to perform a lookup that identifies the requester, such as a processor, that needs the data. In embodiments where a Free Packet Request bit is communicated to the MMIO master using a side-band bus 27 (see FIG. 1), rather than as part of the transaction frame 40, then a 14 bit data provider field may be provided in bits 2:15, such that the status packet has a total length of 16 bits.

A free packet is generated by the MMIO master, which may be initiated either periodically by the MMIO master or in response to a request for a free packet by an MMIO slave. When the counter is non-zero, the MMIO master may periodically send one or more free packets to the MMIO ring. An MMIO slave that becomes unsuspended may then reserve the next arriving packet by setting the Reservation Status bit to "ACK." As noted above, the Free Packet Request bit is preferably communicated separately from the transaction frame 40, such as using a side-band bus. However, as an alternative approach, an MMIO slave may request a free packet from the MMIO master by setting an optional Free Packet Request bit, which is Bit 2 of the status packet 42 in this example. The side-band bus is preferable, to prevent delays in returning available data due to any potential lull in frame traffic. The side-band bus may also be preferable so that Bit 2 is freed up to be used as part of a data provider field.

Figure 3:
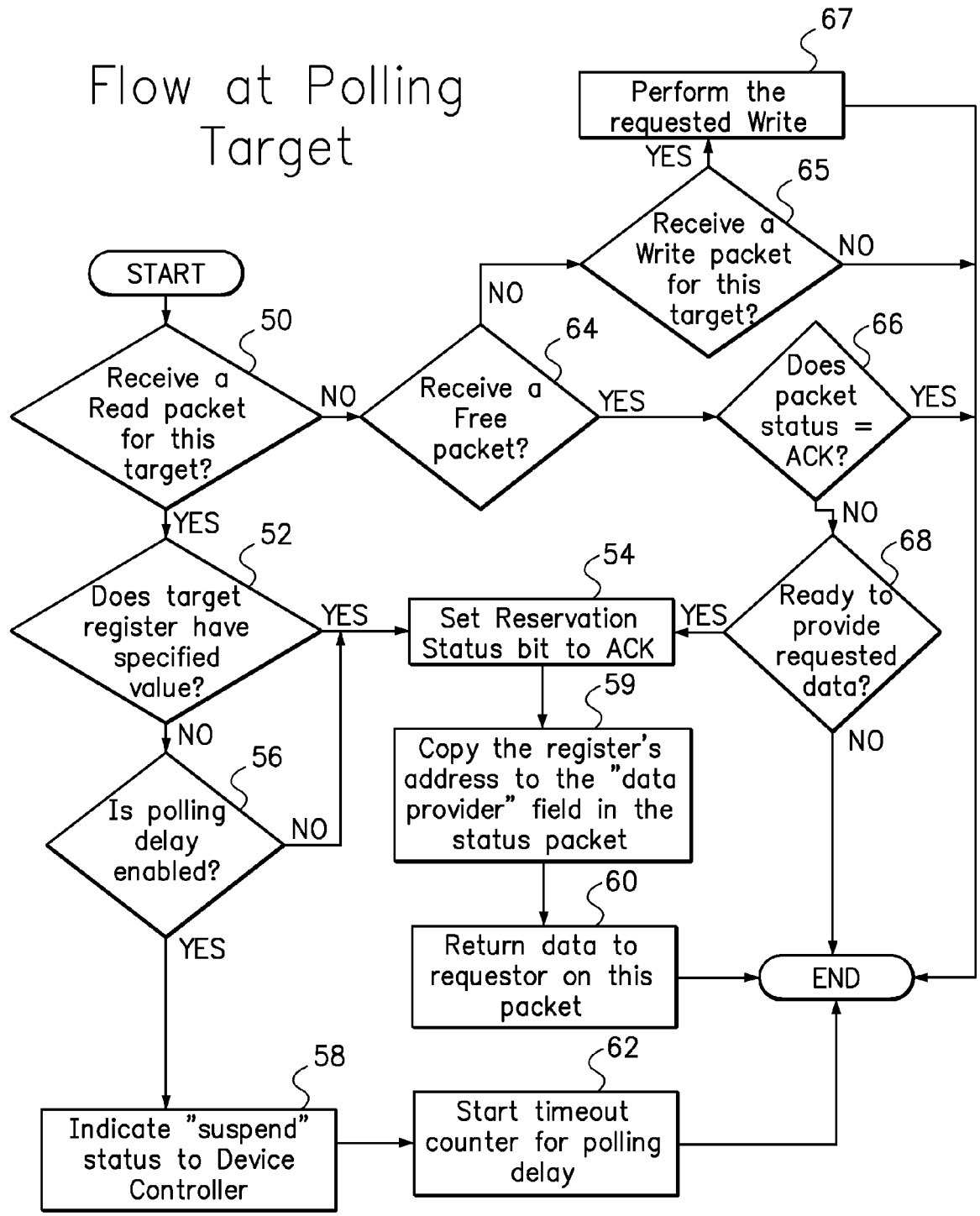
FIG. 3 is a flowchart of a process for polling a target register in an MMIO-based system.

FIG. 3 is a flowchart of an example process flow at a target register being polled using an MMIO-based system, such as the system 10 of FIG. 1. The flowchart focuses on an example wherein a "read" operation is to be handled by the MMIO slave assigned to the particular target register being polled. Conditional step 50 queries whether a read-type packet was received for the target register. If so, then conditional step 52 queries whether the target register has a requested value accompanying the requested read operation. If the target register already has the requested value per conditional step 52, then the MMIO slave handling the requested read operation may set the Reservation status bit to "ACK" per step 54, copy the target register's address to the "data provider" field per step 59, and simply return the requested data per step 60, without any polling.

If the target register does not have the requested value, then conditional step 56 queries whether polling delay is enabled. If polling delay is not enabled, then the MMIO slave sets the Reservation status bit to "ACK" per step 54, copies the target register's address to the "data provider" field per step 59, and simply returns the current value of the requested data per step 60. Using an example provided above, the target register may be a single buffer status bit having a value set to "1" in response to a write operation and cleared to "0" in response to a read operation. By this convention, a value of "0" for the buffer status bit would indicate that the present value of the data has already been read, so that there is not yet a more current value of that data to be read, and a value of "1" would indicate that the data contains newer data than the previously read data. Thus, if the target register does not have the requested value per conditional step 52, but polling delay is not enabled per conditional step 56, then the data returned in step 60 will be the same as the data previously returned in response to a prior read operation.

If polling delay is enabled per conditional step 56, however, then a "suspend" status is returned to the MMIO master (device controller) per step 58. For example, the suspend status may be returned by setting a status bit (such as Bit 1 of the Status Packet 42 in FIG. 2). The MMIO slave handling the request may also be regarded as suspended in that the MMIO slave will wait for the requested value of the target register to occur (subject to any timeout function) before performing the requested read operation and returning a result to the device controller. A timeout counter is started in step 62 to provide a predefined timeout period during which the target register may be polled. The timeout function will be further discussed with reference to FIG. 4.

A subsequent pass through the flowchart returns to conditional step 50. If a subsequently received packet is not a read-type packet, the process will proceed to conditional step 64 to determine whether the subsequently received packet is instead a free packet (which is not targeted to a specific MMIO slave, but rather is available to any of the MMIO slaves on a first-come, first-served basis). If the subsequently received packet is not a free packet, then conditional step 65 is to determine whether the subsequently received packet is a write packet for this target. If the packet is a write packet for this target, then the requested write operation is performed per step 67. If the packet is not a free packet and not a write packet for this target, the MMIO slave may simply pass the packet on to the next MMIO slave or back to the MMIO master.

Referring again to conditional step 64, if the subsequently received packet is a free packet, then conditional step 66 determines whether a Reservation status bit is already set to ACK (which indicates another MMIO slave has already reserved this packet). If the packet is not reserved per conditional step 66, and if the MMIO slave handling the request is ready to provide the data requested in the read operation per conditional step 68, then the MMIO slave sets the Reservation status bit to "ACK" per step 54, copy the target register's address to the "data provider" field per step 59, and returns the requested data per step 60.

Because there could be multiple suspended registers, when one becomes unsuspended, the device controller 22 needs to know where to send the data that has been read (such as processor i, read buffer j). When device 20 puts read data on bus 14 that was requested by requestor/processor 12, it must send some sort of identifier (aka tag) with the data so that it is routed to the correct requestor 12 and to the correct buffer within that requestor. For the case when a read is satisfied immediately by the initial read frame, the device controller 22 can simply examine the command & status packets to know (1) to what requestor the read frame was targeted and (2) that the read data is present. The device controller 22 then uses the address from the command packet as an identifier to perform a lookup into some sort of table/list to find the tag that needs to be sent with the data onto bus 14.

However, for the case when a read is satisfied by a free packet, there needs to be some way to associate the data coming to the device controller 22 with its ultimate destination. Accordingly, step 59 copies the register's address into a "data provider" field in the status packet. In this manner, the device controller 22 only need look at the status packet for both the read frame and the free packet frame in order to perform the lookup to find the tag for the data's destination.

Figure 4:
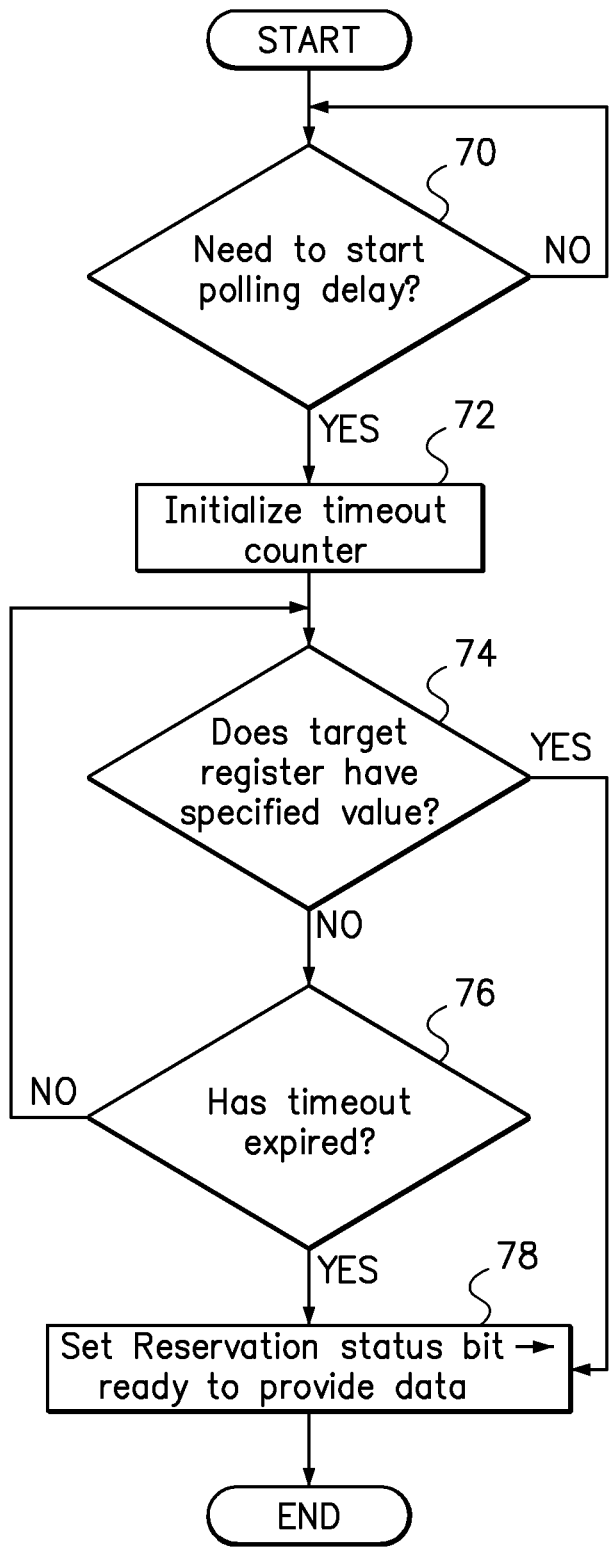
FIG. 4 is a flowchart of a timeout process for polling a target register of an MMIO-based system.

FIG. 4 is a flowchart of an example timeout process for an MMIO-based system, such as the system 10 of FIG. 1. Conditional step 70 queries whether a polling delay is to be started, whereby the requested R/W operation will be delayed until a requested value of a target register has occurred. A timeout counter is initialized in step 72. Conditional step 74 queries whether the target register currently has the requested value. Conditional step 76 queries whether the timeout interval has expired. This establishes a loop between steps 74 and 76 that occurs up to the duration of the predefined timeout interval. If the target register has the requested value before the expiration of the timeout interval, a Reservation status bit is set in step 78, indicating that a result of the requested R/W operation (e.g. the data of a requested read operation) is ready to be provided. According to conditional step 76, if the predefined timeout interval expires before the requested value of the target register has occurred, then the Reservation status bit is still set according to step 78 and a result of the requested R/W operation based on the current value of the target register is performed. Alternatively, the device that requested the R/W operation (e.g. the CPU) may be informed that the requested value of the target register has not yet occurred. Then, the requesting device may renew the request and a polling delay may be re-initiated according to the flowchart.

Figure 5:
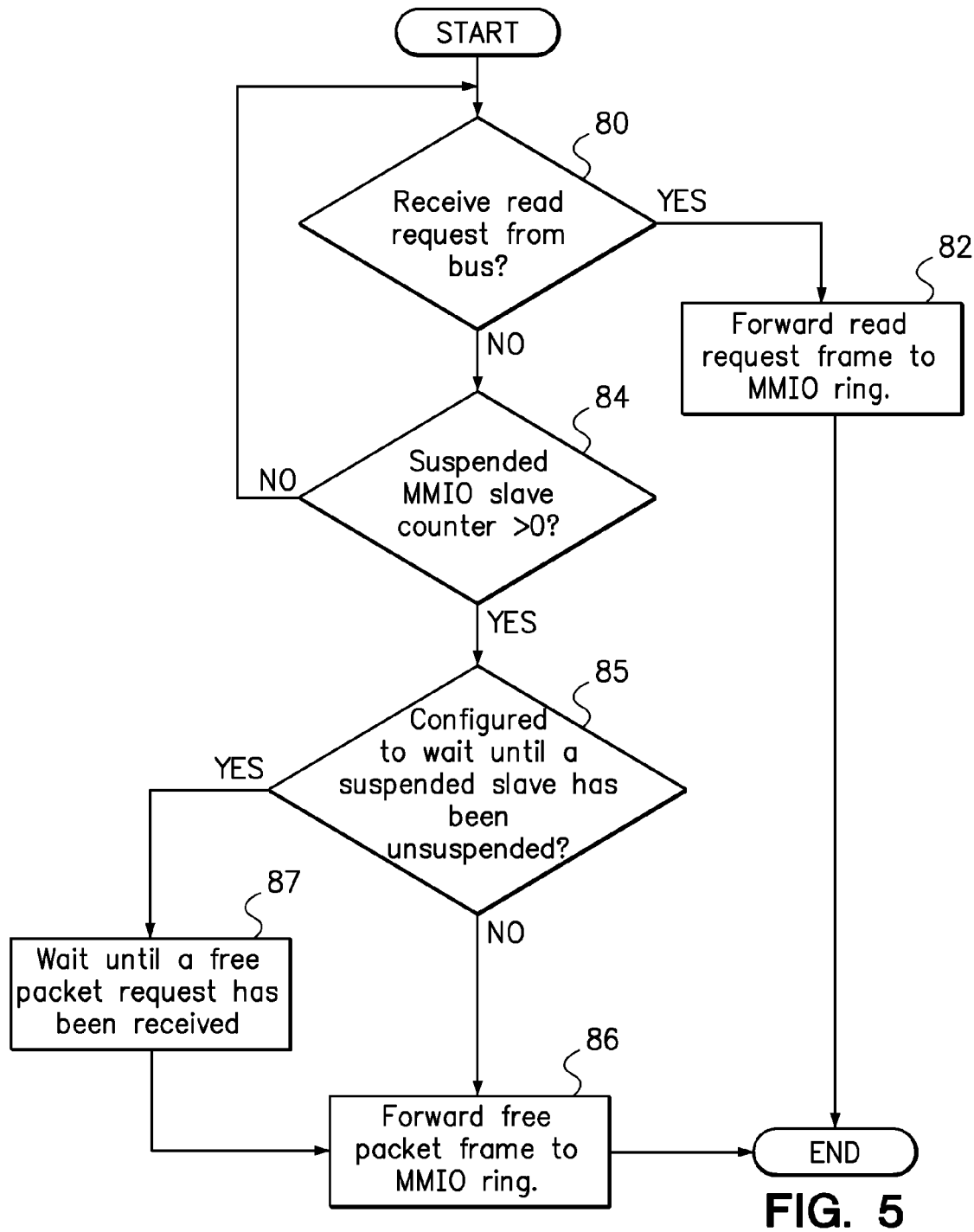
FIG. 5 is a flowchart of an example of a process performed by an MMIO master in response to receiving a requested read operation.

FIG. 5 is a flowchart of an example process flow at an MMIO master in receiving a requested read operation. The MMIO master will handle both read requests and write requests, although the present disclosure focuses specifically on polling for read requests. Conditional step 80 queries whether a read request has been received from a bus over which a requesting device (e.g. CPU) and a peripheral device communicate. If a requested read operation is received, a read request frame (e.g. the frame 40 of FIG. 2) is forwarded to an MMIO ring at the peripheral device in step 82 (note that a write request frame would alternatively be forwarded to an MMIO ring in response to a write request). The MMIO ring may then handle the requested read operation, including any polling that is to be performed at the peripheral device. If a read request is not received in conditional step 80, then conditional step 84 determines whether a suspended MMIO slave counter currently has a non-zero value. An example of such a counter 25 is discussed above with reference to FIG. 1. If the counter is greater than zero, step 85 determines whether the system is configured to wait until one of the suspended slaves has been unsuspended. If the system is so configured, then step 87 waits until a free packet request has been received. When either a free packet request is received per step 87 or the system is not configured to wait for the free packet request per step 85, then a free packet frame is forwarded to the MMIO ring handling the requested read operation that was previously forwarded to the MMIO ring in step 82. A free packet frame is a frame whose command is set to "free", wherein a free packet frame is a special type read frame. The free packet frame is forwarded to the MMIO ring in step 86 so that the MMIO slave handling the requested read operation may place a result of the requested read operation (e.g. data of a requested read operation) in the free packet frame to be forwarded back to the requesting device.

Figure 6:
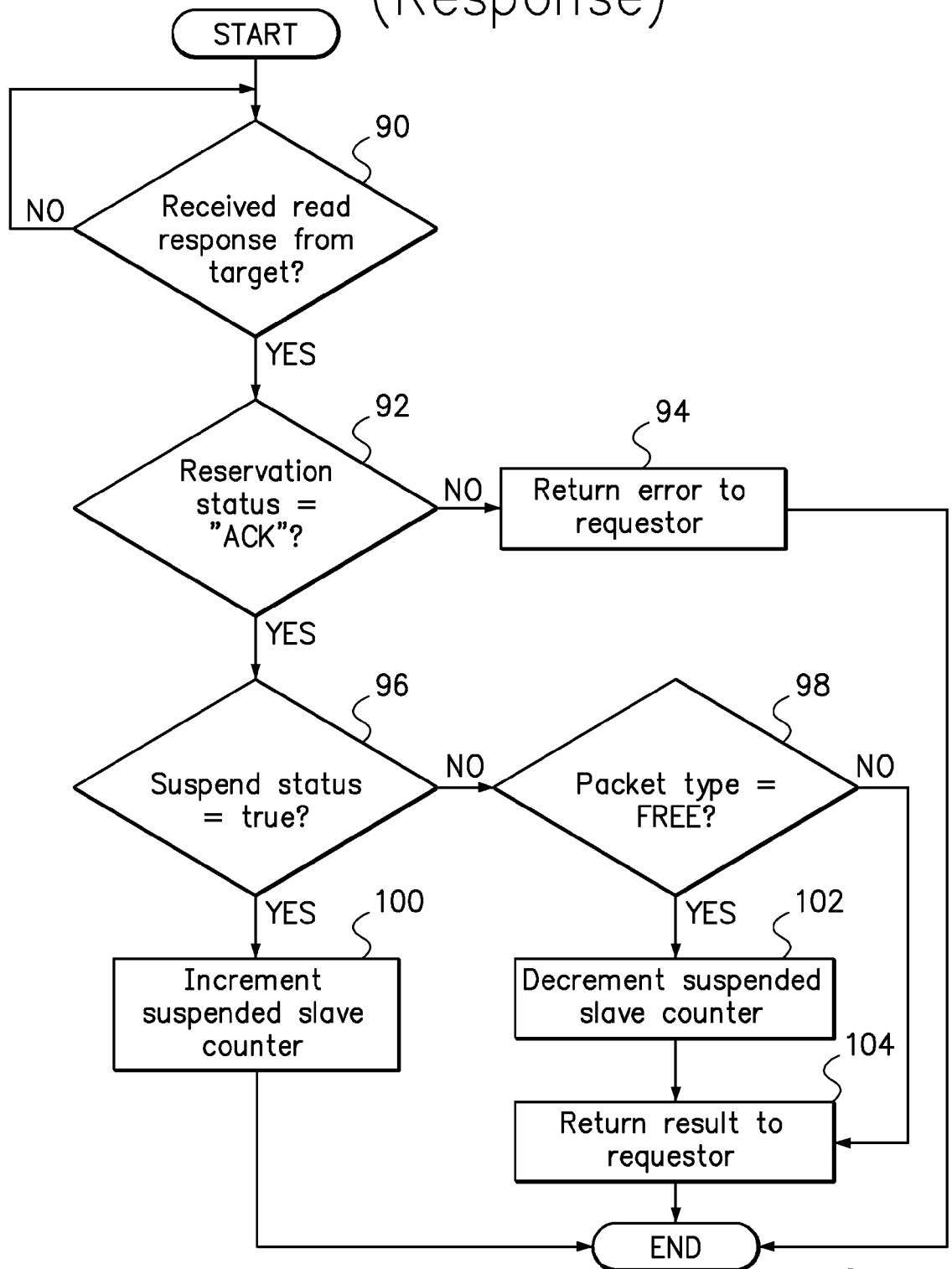
FIG. 6 is a flowchart of an example of a process performed by an MMIO master in response to receiving a response to the requested read operation.

FIG. 6 is a flowchart of an example process flow at an MMIO master in responding to the requested read operation. Conditional step 90 queries whether a read response has been received from an MMIO slave assigned to a target register being polled for a requested value. If a read response is received, then conditional step 92 checks whether a frame has been reserved by an MMIO slave, which may be indicated by a Reservation status bit being set to "ACK," (e.g. a bit value of 1). Presumably, the reservation status would ordinarily be set to ACK when an MMIO slave has used that frame to place the result of a read operation. If the requestor (e.g., CPU) selects a particular peripheral device as the target of its request, then the requester should select a valid register inside that peripheral device. Therefore, an error is returned to the requestor (e.g. CPU) if the Reservation status bit is not set to ACK according to step 94. However, assuming the Reservation status bit is set to ACK, then conditional step 96 checks whether the read response includes "SUSPEND," which may be indicated by a Suspend status bit being set to true (e.g. a bit value of 1). If so, the suspended slave counter is incremented per step 100.

If the suspend status of step 96 is not set to true, then conditional step 98 checks the packet type. If the packet type indicates that the received read response is a free packet frame, then the suspended MMIO slave counter is instead decremented per step 102. Thus, the suspended MMIO slave counter is decremented to reflect a previously suspended MMIO slave has now provided its data. While the suspended MMIO slave counter is incremented when a read frame reports the "suspend" status, indicating that it will need free packet frame(s) in the future to give it chances to send its data at some point, the counter is decremented only when a previously-suspended register has actually provided its data because it no longer needs free packet frames. Therefore, the need for free packets continues past the point of being unsuspended, and continues until the slave has been able to acquire a free packet frame and has actually sent its data. The result of the read operation (e.g. the read data) is then returned to the requestor in step 104. As mentioned above, a free packet may be generated in a first case when the MMIO master knows that there are suspended slave(s) and accordingly, sends out a free packet periodically. A slave may then use one of those free packets to send its data when it's ready. The second case mentioned above is when the MMIO master is not aware that there are suspended slaves and accordingly waits for a slave to signal that it needs a free packet. This signal could be a single wire that's shared by all slaves to indicate their need for a free packet; in this case, each slave just performs a logical OR onto the wire.

It should be noted that the above flowcharts assume an MMIO ring topology, by way of example, wherein a frame comprises a command packet with a status response in the same or subsequent packet and followed by one or more data packets. One skilled in the art will appreciate that the disclosed principles of confining the polling of a target register to a peripheral device containing the target register may be applied to systems having alternative topologies. The process flow may vary for such other topologies, but the disclosed principles still apply.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of controlling electronic input/output at a peripheral device of a computer system, the method comprising:

transmitting a requested read or write operation from a processor to a memory-mapped input/output (MMIO) ring on the peripheral device allowing communication between a master and a plurality of slaves;
the peripheral device identifying a requested value of a target register on the peripheral device as a precondition to performing the requested read or write operation;
determining, by address, which of the plurality of slaves is responsible for the target register;
suspending the slave responsible for the target register in response to determining that the polled value of the target register is not yet equal to the requested value of the target register;
the peripheral device periodically internally polling the value of the target register while the slave responsible for the target register is suspended; and
in response to the polled value of the target register having the requested value, un-suspending the slave responsible for the target register and performing the read or write operation, and using a free packet to provide a result of the read or write operation to the processor.

2. The method of claim 1, further comprising:
communicating the requested read or write operation from the processor to the peripheral device over a bus; and
in response to having performed the requested read or write operation in the peripheral device, communicating a result of the read or write operation from the peripheral device back to the processor over the bus.

3. The method of claim 1, further comprising:
the peripheral device repetitively polling the target register internal to the peripheral device for up to a predefined timeout interval.

4. The method of claim 3, further comprising:
the processor re-requesting the previously requested read or write operation in response to expiration of the predefined timeout interval.

5. The method of claim 1, further comprising:
the master generating the free packet such that the free packet is initially not targeted to a specific slave and supplying the free packet to the MMIO ring; and
in response to the target register having the requested value, un-suspending the slave responsible for the target register, reserving the free packet to the slave responsible for the target register, and performing the requested read or write operation at the slave responsible for the target register and providing the result of the read or write operation to the master using the reserved free packet.

6. The method of claim 5, further comprising:
the master forwarding the result of the read or write operation to the processor.

7. The method of claim 5, further comprising:
in the master, periodically generating the free packet and passing the free packet among the slaves until the slave responsible for the target register reserves the free packet.

8. The method of claim 1, further comprising:
in response to the target register having the requested value, generating a free-packet-request indication from the slave responsible for the target register; and
in the master, detecting the free-packet-request indication and generating the free packet in response to detecting the free-packet-request indication.

9. The method of claim 8, wherein the step of generating the free-packet-request indication further comprises:
the slave sending a free packet request status bit to the master over a side-band bus.

10. The method of claim 9, further comprising:
the master sending the free packet to the ring in response to receiving the free packet request status bit.

11. The method of claim 1, wherein the requested value is a status bit of the target register.

12. The method of claim 1, wherein the requested value is a string of data bits within the target register.

13. A computer system, comprising:
a peripheral device having a device controller and a memory-mapped input/output (MMIO) ring allowing communication between a master and a plurality of slaves, the device controller configured for receiving a requested read or write operation from a processor thread and identifying a requested value for a target register of the peripheral device as a precondition to performing the requested read or write operation, for determining by address which of the plurality of slaves is responsible for the target register, for periodically internally polling the target register until the target register has a requested value, for suspending the slave responsible for the target register in response to determining that the polled value of the target register is not yet equal to the requested value of the target register, and, in response to the target register having the requested value, un-suspending the slave responsible for the target register and performing the read or write operation, using a free packet to provide a result of the read or write operation to the processor thread.

14. A method of controlling electronic input/output at a peripheral device of a computer system, the method comprising:
transmitting a command packet containing a requested read or write operation from the processor thread to a memory-mapped input/output (MMIO) ring on the peripheral device allowing communication between an MMIO master and a plurality of MMIO slaves;
the peripheral device identifying a requested value of a target register on the peripheral device as a precondition to performing the requested read or write operation;
determining, by address, which of the plurality of MMIO slaves is responsible for the target register;
at the MMIO slave device responsible for the target register, generating a suspend status in response to determining that the polled value of the target register is not yet equal to the requested value of the target register;
in response to the suspend status, using the MMIO master to periodically poll the value of the target register during the suspend status;
in response to the polled value of the target register having the requested value, generating a free-packet-request indication from the MMIO slave responsible for the target register;
in the MMIO master, detecting the free-packet-request indication and generating the free packet in response to detecting the set free-packet-request indication; and
performing the read or write operation and using the free packet to provide a result of the read or write operation to the processor thread.

* * * * *